US007564999B2

(12) United States Patent
Luo

(10) Patent No.: US 7,564,999 B2
(45) Date of Patent: Jul. 21, 2009

(54) METHOD FOR IDENTIFYING MARKERS IN RADIOGRAPHIC IMAGES

(75) Inventor: Hui Luo, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 475 days.

(21) Appl. No.: 11/188,422

(22) Filed: Jul. 25, 2005

(65) Prior Publication Data

US 2007/0019853 A1 Jan. 25, 2007

(51) Int. Cl.
*G06K 9/00* (2006.01)
(52) U.S. Cl. ...................................... 382/128
(58) Field of Classification Search ......... 382/128–132, 382/201; 600/407, 417
See application file for complete search history.

(56) References Cited

U.S. PATENT DOCUMENTS

| | | | | |
|---|---|---|---|---|
| 3,875,412 | A * | 4/1975 | Hozumi | 378/208 |
| 5,263,074 | A | 11/1993 | Sakamoto | |
| 5,987,345 | A * | 11/1999 | Engelmann et al. | 600/407 |
| 6,354,737 | B1 | 3/2002 | Hufe et al. | |
| 6,778,703 | B1 | 8/2004 | Zlotnick | |
| 6,980,680 | B2 * | 12/2005 | Batchelder et al. | 382/128 |
| 7,035,450 | B1 * | 4/2006 | Muller et al. | 382/154 |
| 7,418,123 | B2 * | 8/2008 | Giger et al. | 382/132 |
| 2003/0026469 | A1 * | 2/2003 | Kreang-Arekul et al. | 382/132 |
| 2003/0048938 | A1 * | 3/2003 | Wang et al. | 382/132 |
| 2003/0228044 | A1 * | 12/2003 | Gopalasamy et al. | 382/132 |
| 2004/0101180 | A1 * | 5/2004 | Doi et al. | 382/128 |
| 2005/0031181 | A1 * | 2/2005 | Bi et al. | 382/132 |

FOREIGN PATENT DOCUMENTS

GB 2 405 508 3/2005
WO 2004/008496 1/2004

OTHER PUBLICATIONS

Ricky K. et al. "Automatic Structuring of Radiology Free-Text Report", info RAD, vol. 21, No. 1, Jan.-Feb. 2001, pp. 237-245.*
Database WPI week 200060, Derwent Publications Ltd., London, GB, 1997-503326, XP002413869 & NZ 503 819 A (Commonwealth Sci & Ind Res Org) Sep. 29, 2000 (abstract).
Pattern Recognition Letters, Pattern Recognition Letters 20 (1999) pp. 521-533, "Recognition of radiopaque markers in X-ray images using a neural network as nonlinear filter", M. Egmonth-Petersen, T. arts.
Pattern Recognition, vol. 31, No. 9, pp. 1369-1390, (1998), "Shape-Based Retrieval: A case study with trademark image databases", Anil K. Jain, Aditya Vailaya.
IEEE Transactions on Image Processing, vol. 10, No. 6, Jun. 2001, Multiple Classifiers for Color Flag and Trademark Image Retrieval, Ing-Sheen Hsieh, Kuo-Chin Fan.

* cited by examiner

*Primary Examiner*—Sherali Ishrat

(57) ABSTRACT

A method for automatically recognizing a marker in a radiographic image. The method includes the steps of: accessing the radiographic image in digital form; segmenting the digital image into a plurality of regions; detecting a marker region from the plurality of regions; and recognizing the marker disposed within the marker region to determine the marker's semantic meaning.

12 Claims, 4 Drawing Sheets

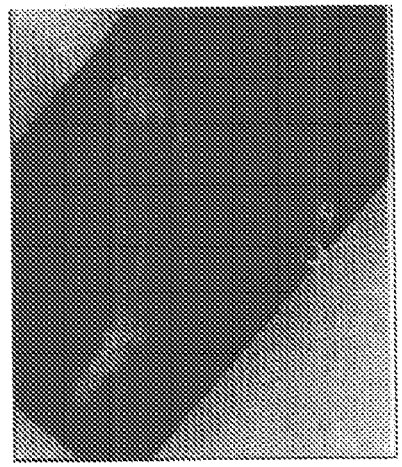
*FIG. 3A*
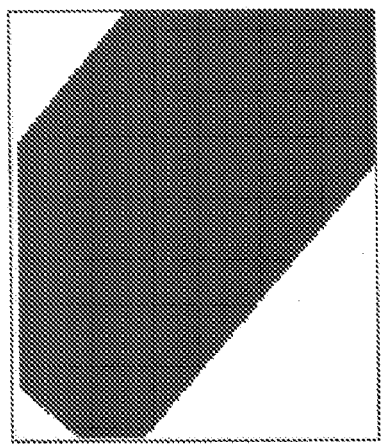 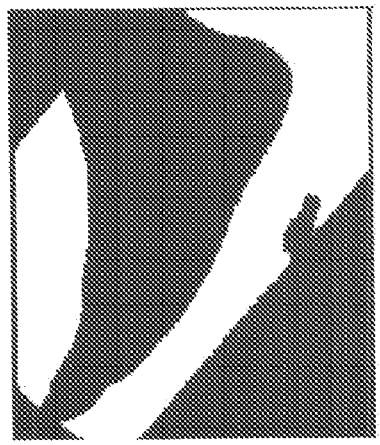
*FIG. 3B*        *FIG. 3C*
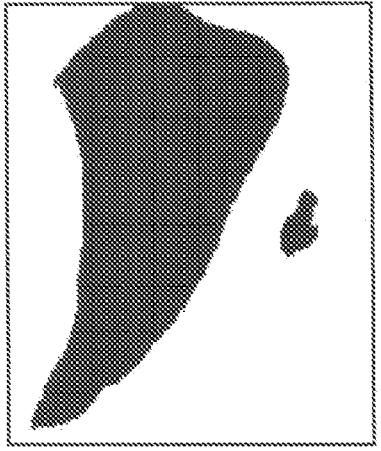 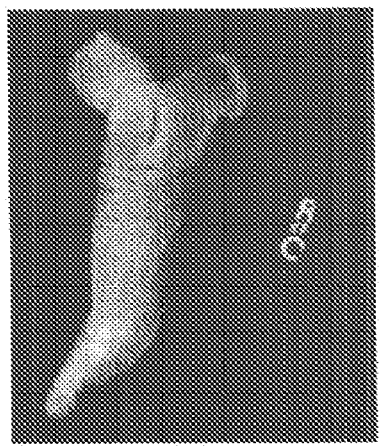
*FIG. 3D*        *FIG. 3E*

METHOD FOR IDENTIFYING MARKERS IN RADIOGRAPHIC IMAGES

FIELD OF THE INVENTION

This invention relates generally to techniques for processing radiographs, and more particularly, to techniques for automatically identifying markers in radiographic images.

BACKGROUND OF THE INVENTION

Devices for capturing radiographic images are generally comprise two main components. One is an X-ray tube adapted to generate a beam of X-rays along a defined axis, and the other is an X-ray receiver disposed in the path of the X-ray beams to capture the X-ray. The X-ray receiver can be provided with a film, a storage phosphor sheet/cassette (Computed Radiography or CR), or an electronic device (Direct Radiography or DR). The anatomy to be studied is arranged between the X-ray tube and the receiver. When X-rays pass through the anatomy and impinge the receiver, a radiograph image of the anatomy is generated.

In routine assessments of radiographs, the relative position of patient during exposure is typically desired. Consequently, a marker with letters or symbols made of lead is often used. The marker is arranged on the path of the X-rays, for example on the receiver, so that the radiograph bears the mark of these letters/symbols. Generally, markers are made by using standardized abbreviations, indicating whether the left or right part of the patient's body is being radiographed, which projection is being taken, and/or the patient's position. In some situations, the marker may also contain symbols representing the hospital, institute or clinic site, conducting the radiographic study.

It is desirable to identify the marker in a radiograph, since the marker provides useful information for correctly displaying the radiograph. For instance, the left and right markers are usually used to identify the side of the body part. If such information is ignored and an image is incorrectly displayed, a misdiagnosis can cause serious damage. In the case of chest radiography, wrong side information may lead to performing a biopsy not on the lung presenting a lung nodule or other symptoms, but on the other healthy lung.

Another advantage of recognizing/identifying the marker is that it helps to provide the information needed for storing and managing images in picture archiving and communication systems (PACS), radiology information systems (RIS) and hospital information systems (HIS). For example, in mammography, a marker is generally needed to specify the projection during image acquisition. In order to appropriately store and retrieve image, the projection is also required in DICOM header. Currently, this information is manually input by technologists. Applicants have recognized that if the marker can be automatically recognized and filled into the DICOM header, it would reduce the input time and incidence of mislabel or unlabeled images, therefore, greatly improve the workflow.

Egmont-Petersen et. al ("Recognition of radiopaque markers in X-ray images using neural network as nonlinear filter", Pattern Recognition Letter, Vol. 20, pp 521-533, 1999) developed an approach for recognizing of markers in cineangiographic images based on neural networks. However, their markers are small gold spheres, and always appear as circular-symmetric shapes in images, which are totally different from the markers mentioned in the present invention. Moreover, their markers serve as landmarks for locating anatomical structures; in contrast, radiographic image markers can be used to identify the examination conditions and usually have the semantic meanings associated with them. Due to the different purposes, Egmont-Petersen's approach is not suitable the present problem setting.

U.S. Pat. No. 6,354,737 issued Mar. 12, 2002 to Hufe et al. entitled DIGITAL IMAGE ORIENTATION MARKER discloses a method for generating an orientation marker for a digital radiogram after exposure. This marker is formed by a plurality of pixels arrayed along a plurality of rows and columns of pre-defined patterns. Therefore, it is not necessary to recognize/identify the marker.

In the field of image recognition and retrieval, some approaches have been proposed to identify trademarks. For example, Jian et. al ("Shape-based retrieval: A case study with trademark image databases", Pattern Recognition, Vol. 31, No. 9, pp 1369-1390, 1998) proposed a method for trademark image database retrieval based on object shape information that would supplement traditional text-based retrieval systems. Hsieh et. al. ("Multiple classifiers for color flag and trademark image retrieval", IEEE transaction on image processing, Vol. 10, No. 6, pp 938-950, 2001) presented a region-based multiple classifier color image retrieval system. Due to the characteristics of trademark images, while these approaches mentioned above may have achieved certain degrees of success in their particular applications, these approaches are not appropriate for identifying the markers in radiographs directly, because, compared to trademark images, radiographic images present much more complicated characteristics. Firstly, the radiographic images are grey level images, while trademark images are generally binary images or images with very limited color/grey levels. Secondly, the radiographs include more image contents, such as collimation areas, direct exposure area and diagnostic relevant regions. The marker is a very small region in the image and needs to be detected before recognition; otherwise its information can be totally buried by other image regions. However, for trademark images, since the trademark generally occupies the entire image, recognition can be directly performed on the image.

Accordingly, there exists a need for a method to automatically identify markers in radiographic images. Such a method should be robust and suited to accommodate variations in radiographs

SUMMARY OF THE INVENTION

An object of the present invention is to provide an automated method for identifying markers in a radiographic image.

Another object of the present invention is to provide a method for correctly displaying the radiograph according to its marker.

Yet a further object of the present invention is to provide a method to automatically extract the appropriate information from markers so that this information can be stored in the image header.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

In the present invention, a method comprises two steps: detecting the marker region in an input radiograph and recognizing the marker in the radiograph. The step of detecting the marker region includes segmenting an input radiograph into collimation areas, direct exposure areas and diagnosis relevant regions, labeling all diagnosis relevant regions, and locating the marker region. The step of recognizing the marker is accomplished by optical character recognition or marker image matching. If desired, the radiograph can then be displayed and the image header can be updated according to the information obtained from the marker.

According to one aspect of the present invention, there is provided a method for automatically recognizing a marker in a radiographic image. The method includes the steps of: accessing the radiographic image in digital form; segmenting the digital image into a plurality of regions; detecting a marker region from the plurality of regions; and recognizing the marker disposed within the marker region to determine the marker's semantic meaning.

According to another aspect of the present invention, there is provided a method for automatically recognizing a marker in a radiographic image. The method includes the steps of: accessing the radiographic image in digital form; segmenting the digital image into a plurality of regions; labeling each of the plurality of regions; identifying the marker region by locating the marker within one of the plurality of labeled regions; extracting the marker region from the digital image; transforming the marker region into a standard position; aligning the marker region with a target marker; computing a similarity measure between the marker region and the target marker; repeating the steps of aligning and computing with other target markers; determining which one of the plurality of target markers computes the highest similarity measure; and identifying the one target marker which computes the highest similarity measure as the marker to recognize the semantic meaning.

BRIEF DESCRIPTION OF THE DRAWINGS

The foregoing and other objects, features, and advantages of the invention will be apparent from the following more particular description of embodiments of the invention, as illustrated in the accompanying drawings. The elements of the drawings are not necessarily to scale relative to each other.

FIGS. 3A-3E show diagrammatic views illustrating a segmentation step. FIG. 3A displays an original image. FIGS. 3B-3D depict collimation areas, direct exposure areas, and diagnosis relevant regions, respectively. FIG. 3E shows a final result of a segmented image.

FIG. 5A displays a marker region image. FIG. 5B is the intensity histogram of the marker region image.

DETAILED DESCRIPTION OF THE INVENTION

Figure 1A:
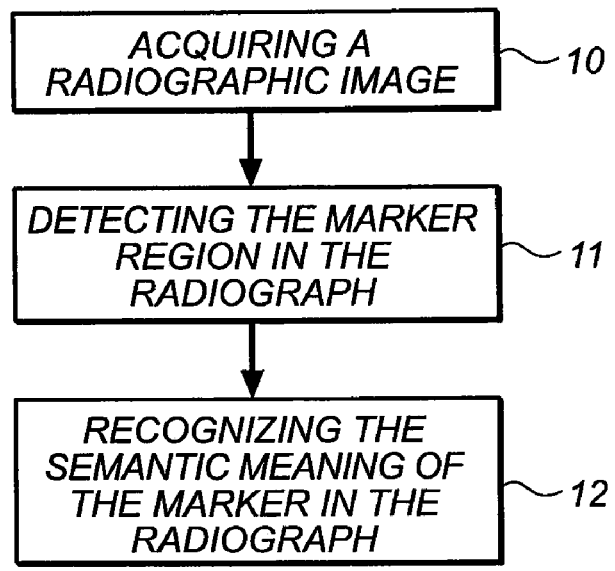
FIGS. 1A and 1B show flow charts illustrating automated methods for identifying markers in a radiograph in accordance with the present invention.

The following is a detailed description of the preferred embodiments of the invention, reference being made to the drawings in which the same reference numerals identify the same elements of structure in each of the several figures.

Figure 1B:
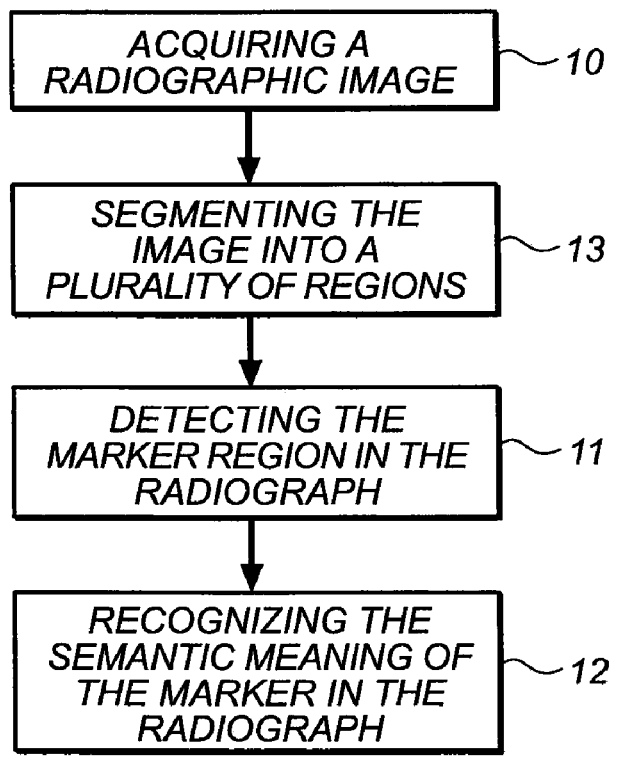

The present invention is directed to a method for automatically recognizing markers in radiographs. That is, detecting a marker and understanding/identifying its semantics/meaning. FIGS. 1A and 1B show flow charts illustrating automated methods in accordance with the present invention.

One embodiment of the method in accordance with the present invention is shown in FIG. 1A. As shown in FIG. 1A, the method includes several steps, including acquiring/accessing a radiographic image in digital form (step 10); detecting the marker region in the radiograph (step 11); and recognizing the marker(step 12). These steps will be more particularly describe below.

In a further embodiment of the present invention, shown in the flow chart of FIG. 1B, an additional step can be accomplished prior to the marker detection of step 11. This additional step, noted in FIG. 1B as step 13, is the segmenting of radiographs, and will be more particularly described below.

Initially, at step 10, a radiographic image is acquired, and is a digital image. It can be acquired directly using modalities known to those skilled in the art (for example, CR or DR), or indirectly by means known to those skilled in the art, for example, by the digitization of an analog x-ray film image.

Figure 2A:
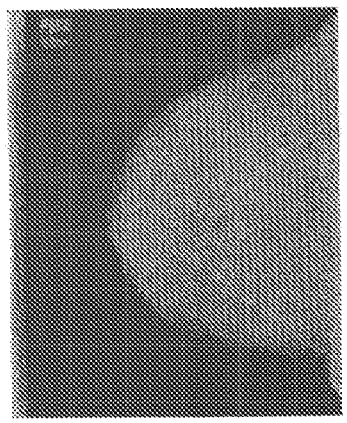
FIGS. 2A-2H show diagrammatic views of radiographs with different markers.
Figure 2B:
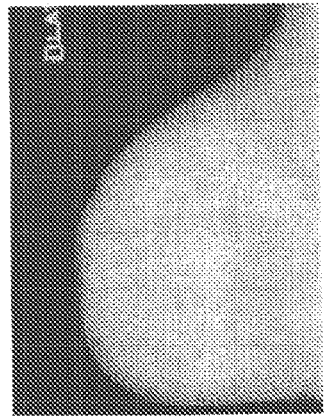
Figure 2C:
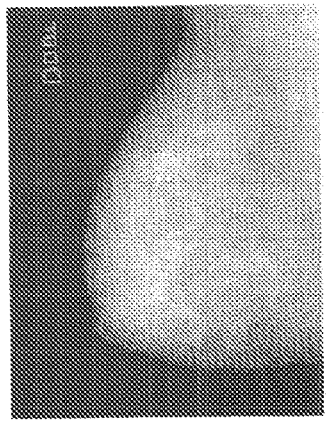
Figure 2D:
Figure 2E:
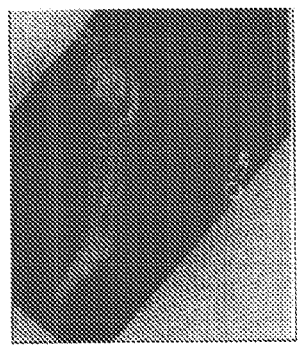
Figure 2F:
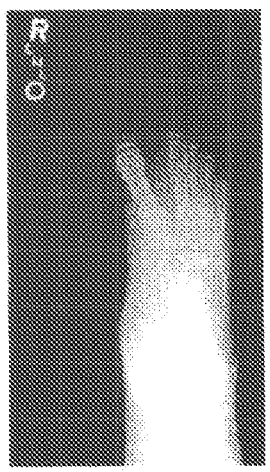
Figure 2G:
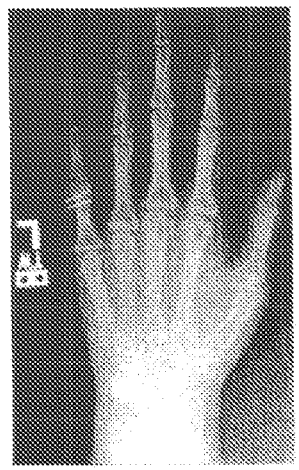
Figure 2H:
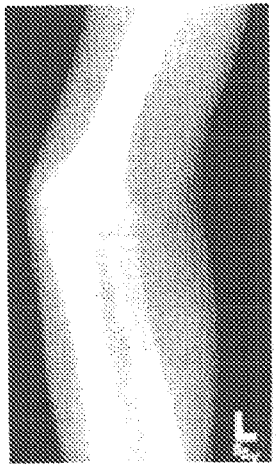

FIGS. 2A-2H shows some radiographs. In these radiographs, different markers are used to specify the associated image information, and they are appeared at arbitrary positions in the images. For example, in FIGS. 2A-2C, the markers are located in the upper left portion of the image (as shown). FIG. 2H is located in the lower right portion of the image. FIG. 2G's marker appears to include both letters and a symbol.

To find these markers in the radiographs, image segmentation (step 13) can be employed. Segmentation methods are known to those skilled in the art. One known segmentation method is to find two thresholds from the image histogram, then use them to segment the image into collimation areas, direct exposure areas and diagnosis relevant regions. FIGS. 3A-3E show diagrammatic views illustrating a segmentation step. FIG. 3A shows an exemplary radiograph of an original image (of a foot) and FIGS. 3B through 3D show its collimation areas, direct exposure areas and diagnosis relevant regions obtained from segmentation, respectively.

Once the image is segmented, the collimation areas and direct exposure areas can be removed from the image by setting the pixels in these regions to a pre-defined background value (for example, equal to 0), but the pixels in the diagnosis relevant regions are kept unchanged. As a result of this step, the segmented image only contains the anatomy and marker regions, as shown in FIG. 3E. FIG. 3E shows a final result of a segmented image.

Figure 4:
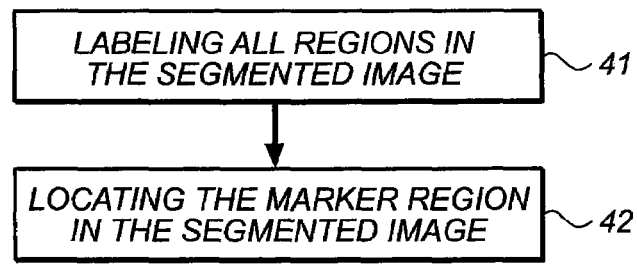
FIG. 4 is a flow chart illustrating a method for detecting the marker region in a radiograph in accordance with the present invention.

As indicated above, detecting the marker region in the radiograph is accomplished at step 11. Referring now to FIG. 4, according to one embodiment of the present invention, the detection of the marker region in the radiograph is accomplished by first labeling all regions in the segmented image (step 41), and then locating the marker region in the image (step 42).

In one embodiment of the present invention, step 41 of image labeling is accomplished by assigning each region with a unique integer number, and the largest integer label usually gives the number of regions in the image. The implementation of this embodiment can be accomplished as follows:

(1) First Pass: search the entire image I row by row, and assign a non-zeros value (label) v to each non-background pixel I(x,y). The value v is chosen according to the labels of the pixel's neighbors, which can be, for example, 4-neighborhood or 8-neighborhood.

(a) If all the neighbors are background pixels, I(x,y) is assigned a new unused label.

(b) If there is just one neighboring pixel with a non-zeros label, assign this label to the pixel I(x,y).

(c) If there is more than one non-zero pixel among the neighbors, assign the lowest label to the pixel I(x,y) and store all labels as being equivalent into an equivalence table.

(2) Second Pass: All of region pixels in the image were labeled during the first pass, but some regions have pixels with different labels (due to label collisions). The whole image is scanned again, and the pixels are re-labeled using the equivalence table information (for example, the lowest value in an equivalence class).

It is noted that the present invention is not limited to using this embodiment to perform region labeling. Other suitable algorithms may be known to those skilled in the art and can be employed.

Step 42 of locating the marker region in the radiograph can be accomplished by evaluating the size of all the labeled regions. According to a preferred embodiment of the present invention, the size of region is determined by the total number of pixels in the region. The regions with large size are usually corresponding to the anatomy in the radiographs, while the regions containing only a few pixels are generally noise in the image. To facilitate the evaluation, two thresholds can be used. One is the upper limit threshold, which separates the anatomy region from the rest of regions. The other is the lower limit threshold used to remove all noise regions. The regions with size between these two thresholds are considered as candidates of the marker region.

Figure 5A:
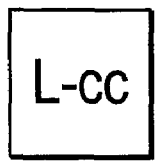
FIGS. 5A and 5B are a diagrammatic views showing the validation of a marker region.
Figure 5B:
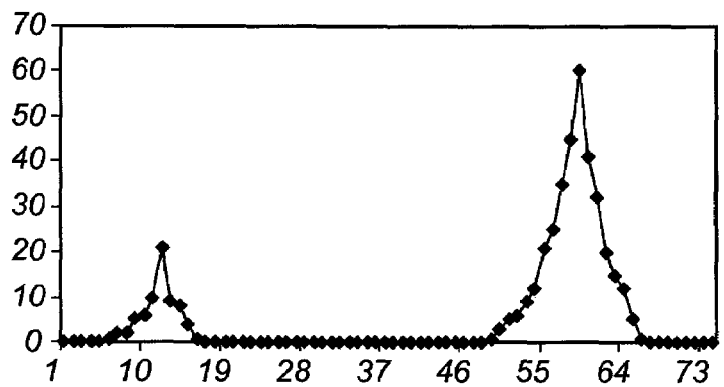

The next step is to find out which candidate region is the marker region. FIG. 5A shows an exemplary marker region image. Generally, the marker is made by lead with X-ray opaque parts and X-ray transparent parts. These parts result in different intensities in the radiograph. The X-ray transparent parts allow the X-ray pass to through, like the direct exposure region. So they have low intensity (illustrated as a black pixel) in the radiograph. In contrast, the X-ray opaque parts block the path of X-ray beams, so they appear as high intensity (illustrated as a white pixel) in the radiograph, similar to the collimation areas. Due to this difference, the intensity histogram of a marker region demonstrates two peaks, as shown in FIG. 5B. Therefore, the validation step is to examine this characteristics in the intensity histograms of the candidate regions. If two or more peaks are found in a histogram, as shown in FIG. 5B, the region may contain the marker; otherwise, the region is rejected and treated as noise.

Depending on the recognition requirement and the marker's features, recognizing the marker can be accomplished by several methods including optical character recognition (OCR) and marker image matching.

Optical character recognition translates the marker images into a form that a computer can manipulate (for example, into ASCII codes), and then performs recognition.

Unlike optical character recognition, marker image matching implements recognition by matching the similarity of the marker region with a target marker image. If they are exactly matched or highly/substantially correlated, the marker region is recognized as the target marker. This method is particularly suitable for recognizing symbols in the marker images, since most symbols are hard/difficult to translate into the computer codes.

Figure 6:
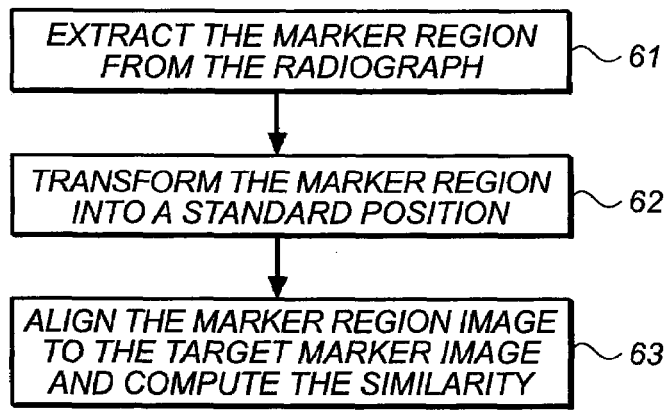
FIG. 6 is a flow chart illustrating the method for recognizing the marker using the marker image match.

Reference is now made to FIG. 6 which shows a flow chart illustrating a method for recognizing the marker using the marker image match (step 12). The marker image match includes three steps: extracting the marker region from the radiograph (step 61); transforming the marker region into a standard position (step 62); and aligning the marker region image to a target marker image and computing their similarity (step 63).

With regard to step 61, the marker region image is extracted from the radiograph and normalized. Thresholding could be performed on the marker region image to simplify/assist the match complexity; this should be performed only when it doesn't degrade the recognition accuracy.

At step 62, the marker region image is transformed into a standard position. After the transformation, the marker region image has scale and position similar to those of the target marker image.

Finally, at step 63, the marker region is aligned to a target marker image, and the similarity between these two images is computed. During the computation of similarity, the marker region is allowed to resize, rotate and translate, in order to find the best match position.

The measure of similarity can be accomplished using methods known to those skilled in the art. One technique to achieve a measure of similarity is correlation coefficient wherein the higher the correlation coefficient, the better the match. Alternatively, other techniques, such as confidence level computed from neural network or fuzzy inference, can be employed to provide the similarity measure.

It is noted that the marker can also be detected and identified using template matching directly on an original image, instead of on the detected marker region after segmentation. This requires searching for the best matching over the entire image, which is computation intensive.

Target marker images are defined by the hospital, institute or clinic site, which conducts the radiographic study. According to the present invention, a tool is provided to help users manage markers. This tool includes three basic functions. The first function is to transform and store an input marker into a digital format (e.g., the marker image). The second function is to maintain the information associated with the markers. To achieve this, a marker image database can be provided. In this database, users can add and/or edit annotations related to each marker. The third function is directed to outputting marker information. The information can be extracted from annotations based on the requirement of image header, and later filled into an image header (for example, a DICOM image header).

During the recognition, each marker in the database can be loaded and treated as a target marker image for image matching. The method chooses the marker image with highest similarity measure as a recognition result and assigns it to the radiograph. The best match parameters can be saved and used for the further study of the radiograph. For example, the scale can help to determine the magnification factor of the image device.

Optical character recognition can be implemented using methods known to those skilled in the art.

Once the marker is recognized, its information can be used for displaying the image, or arranging the image order in accordance with a hanging protocol. For example, the left or right marker provides information regarding whether the image needs to be flipped horizontally, and the projection information can be used to decide when and where to display the radiograph. Moreover, the marker's information, such as projection, can provide the preference for image rendering and help render image satisfying requirements from the specific sites. Furthermore, the information associated with image acquisition may be used for quality assurance.

Based on user's requirement, the output information extracted from marker can be placed/stored into the DICOM header or other image headers (or associated metadata) needed for image storage and management in PACS and RIS/HIS.

The present invention may be implemented for example in a computer program product. A computer program product may include one or more storage media, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The system of the invention includes a programmable computer having a microprocessor, computer memory, and a computer program stored in said computer memory for performing the steps of the method. The computer has a memory interface operatively connected to the microprocessor. This can be a port, such as a USB port, over a drive that accepts removable memory, or some other device that allows access to camera memory. The system includes a digital camera that has memory that is compatible with the memory interface. A photographic film camera and scanner can be used in place of the digital camera, if desired. A graphical user interface (GUI) and user input unit, such as a mouse and keyboard can be provided as part of the computer.

All documents, patents, journal articles and other materials cited in the present application are hereby incorporated by reference.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

10 Step—Acquiring a radiographic image
11 Step—Detecting the marker region
12 Step—Recognizing the marker
13 Step—Segmenting the radiograph
41 Step—Labeling all regions in the segmented image
42 Step—Locating the marker region in the segmented image
61 Step—Extract the marker region from the radiograph
62 Step—Transform the marker region into a standard position
63 Step—Align the marker region image to the target marker image and compute the similarity

What is claimed is:

1. A method for automatically recognizing a marker generated at the same time a radiographic image is generated and having semantic meaning specifying associated image information in the radiographic image, comprising using a computer to perform the following steps comprising the steps of:

accessing the radiographic image in digital form;
segmenting the digital image into a plurality of regions;
detecting a marker region from the plurality of regions; and
recognizing the marker generated at the same time a radiographic image is generated and having semantic meaning specifying associated image information disposed within the marker region to determine the marker's semantic meaning.

2. The method of claim 1, further comprising the step of associating the marker's semantic meaning with the radiographic image.

3. The method of claim 2, wherein the step of associating is accomplished by storing the semantic meaning in a DICOM format.

4. The method of claim 1, wherein the step of detecting the marker region is accomplished by the steps of:
labeling each of the plurality of regions; and
identifying the marker region by locating the marker within one of the plurality of labeled regions.

5. The method of claim 1, wherein the step of recognizing the marker is accomplished using optical character recognition or a marker image match.

6. The method of claim 5, wherein the step of recognizing the marker using the marker image match is accomplished by the steps of:
extracting the marker region from the digital image;
transforming the marker region into a standard position;
aligning the marker region with a target marker;
computing a similarity measure between the marker region and the target marker;
repeating the steps of aligning and computing with other target markers; and
determining which one of the target markers computes the highest similarity measure.

7. The method of claim 6, wherein the step of computing the similarity measure is accomplished by calculating a correlation coefficient or a confidence level from a neural network or fuzzy inference engine.

8. The method of claim 6, wherein a database is provided to manage the plurality of target markers and the method further comprises the steps of:
transforming and storing the plurality of target markers in digital form to generate associated information;
maintaining the associated information in the database;
outputting the associated information needed for image storage and management.

9. The method of claim 1, further comprising the step of using the semantic meaning of the marker to display the image.

10. The method of claim 1, further comprising the step of using the semantic meaning to arrange the radiographic image relative to other radiographic images.

11. The method of claim 1, further comprising the step of using the semantic meaning to render the radiographic image.

12. A computer readable storage medium having computer instructions stored therein causing one or more computers to perform the method of claim 1.

* * * * *